US012717892B2

(12) United States Patent
Cross et al.

(10) Patent No.: US 12,717,892 B2
(45) Date of Patent: Aug. 25, 2026

(54) ATTESTATION ENGINE(S) FOR AUTHENTICATING SOFTWARE DEPLOYMENT

(71) Applicant: Oracle International Corporation, Redwood City, CA (US)

(72) Inventors: David Benson Cross, Bellevue, WA (US); Lee Scott Vorthman, Golden, CO (US)

(73) Assignee: Oracle International Corporation, Redwood City, CA (US)

( * ) Notice: Subject to any disclaimer, the term of this patent is extended or adjusted under 35 U.S.C. 154(b) by 180 days.

(21) Appl. No.: 18/635,532

(22) Filed: Apr. 15, 2024

(65) Prior Publication Data

US 2025/0322058 A1 Oct. 16, 2025

(51) Int. Cl.
*G06F 21/45* (2013.01)
*G06F 21/44* (2013.01)

(52) U.S. Cl.
CPC .............. *G06F 21/45* (2013.01); *G06F 21/44* (2013.01)

(58) Field of Classification Search
CPC ........ G06F 21/45; G06F 21/44; G06F 21/602; G06F 21/57; G06F 21/64; G06F 8/26; G06F 2221/33; G06F 8/60; G06F 8/70; H04L 63/20; H04L 63/10; H04L 9/50; H04L 9/3213; H04L 63/12
USPC .............................................................. 726/1
See application file for complete search history.

(56) References Cited

U.S. PATENT DOCUMENTS

| | | | | |
|---|---|---|---|---|
| 8,220,029 | B2 * | 7/2012 | Zhang | G06F 21/53 726/1 |
| 8,555,072 | B2 * | 10/2013 | Camenisch | G06F 21/645 705/52 |
| 8,738,932 | B2 * | 5/2014 | Lee | G06F 21/72 726/16 |
| 10,735,472 | B2 * | 8/2020 | Wainner | H04L 9/3228 |
| 10,896,266 | B1 * | 1/2021 | BeSerra | H04L 63/062 |
| 10,915,369 | B2 * | 2/2021 | Wang | G06F 9/5033 |
| 11,327,735 | B2 * | 5/2022 | Smith | H04L 9/14 |
| 11,403,401 | B2 * | 8/2022 | Gajananan | G06F 21/57 |
| 11,509,480 | B2 * | 11/2022 | Subramanian | H04L 9/3213 |
| 11,875,288 | B2 * | 1/2024 | Sailer | G06Q 10/06313 |

(Continued)

FOREIGN PATENT DOCUMENTS

| | | | |
|---|---|---|---|
| EP | 4096157 | A1 | 11/2022 |
| WO | 2022272064 | A1 | 12/2022 |

OTHER PUBLICATIONS

Extended European Search Report for EP Application No. 25170092.8, mailed May 27, 2025, 8 pages.

*Primary Examiner* — Sargon N Nano

(57) ABSTRACT

Various embodiments of the present technology generally relate to systems and methods for providing an attestation engine for authenticating compliance of assets within software and cloud-based systems. In an example, a method may include identifying, by an attestation engine, a request to deploy one or more assets, determining, by the attestation engine, that the one or more assets are compliant with one or more policies, and generating, by the attestation engine, a token certifying that the one or more assets are compliant with the one or more policies. Once generated, the attestation engine may assign the token to the one or more assets and validate the one or more assets as compliant with the one or more policies based on the token.

25 Claims, 6 Drawing Sheets

(56) References Cited

U.S. PATENT DOCUMENTS

| | | | | |
|---|---|---|---|---|
| 2003/0037237 | A1* | 2/2003 | Abgrall | H04L 63/062 713/166 |
| 2007/0143629 | A1* | 6/2007 | Hardjono | H04L 63/0823 713/181 |
| 2009/0064292 | A1* | 3/2009 | Carter | G06F 21/33 718/1 |
| 2009/0125974 | A1* | 5/2009 | Zhang | G06F 21/604 726/1 |
| 2014/0282849 | A1* | 9/2014 | Collison | H04W 12/68 726/1 |
| 2019/0394040 | A1* | 12/2019 | Modi | H04L 9/0861 |
| 2020/0084202 | A1 | 3/2020 | Smith et al. | |
| 2020/0159966 | A1* | 5/2020 | Sibert | H04L 9/3271 |
| 2021/0281611 | A1* | 9/2021 | Blitz | H04L 63/20 |
| 2021/0409222 | A1* | 12/2021 | Moran | H04L 9/3234 |
| 2022/0276848 | A1 | 9/2022 | Garaev et al. | |
| 2023/0216849 | A1* | 7/2023 | Smith | H04L 63/20 726/7 |
| 2025/0265337 | A1* | 8/2025 | Kumar | G06F 21/602 |

* cited by examiner

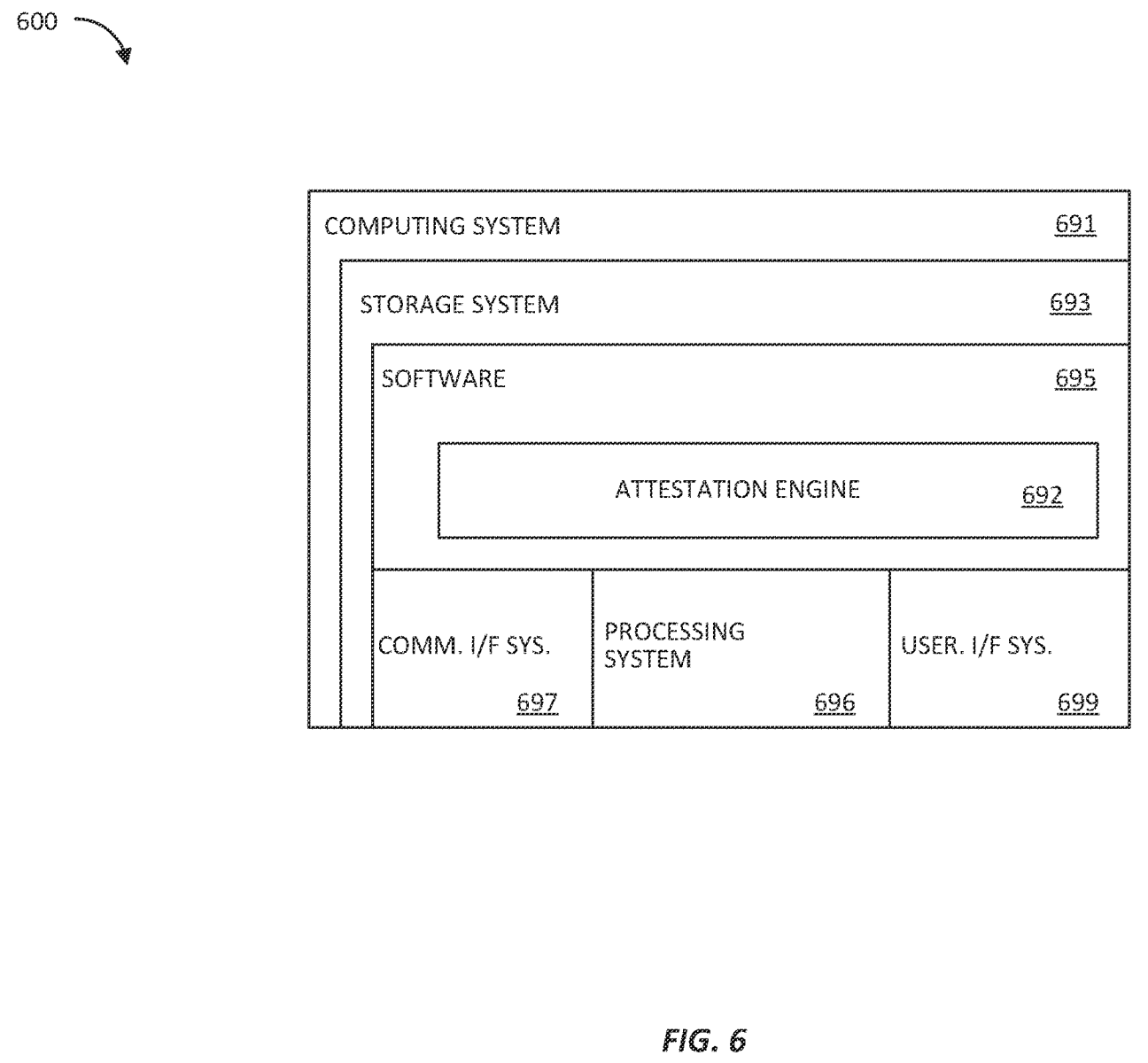

600

COMPUTING SYSTEM 691

STORAGE SYSTEM 693

SOFTWARE 695

ATTESTATION ENGINE 692

COMM. I/F SYS. 697

PROCESSING SYSTEM 696

USER. I/F SYS. 699

FIG. 6

ATTESTATION ENGINE(S) FOR AUTHENTICATING SOFTWARE DEPLOYMENT

TECHNICAL FIELD

Various embodiments of the present technology generally relate to deployment of cloud services, operations and software. More specifically, embodiments of the present technology relate to systems and methods for providing attestation engine(s) for authentication provenance and compliance of software prior to deployment.

BACKGROUND

As software deployment becomes increasingly prevalent, ensuring that it meets stringent audit, compliance, security, financial, and operational requirements prior to release or deployment is paramount. Organizations must validate that their infrastructure and software adhere to industry regulations, security policies, and best practices to mitigate risks and safeguard sensitive data. This validation process involves thorough assessments of security controls, data protection measures, and compliance frameworks to guarantee the confidentiality, integrity, and availability of systems and data. Additionally, validating financial and operational requirements ensures that cloud resources are efficiently utilized, costs are optimized, and performance metrics are met. By conducting comprehensive validations, organizations can instill confidence in their cloud operations, enhance governance, and uphold the trust of stakeholders, ultimately driving successful deployments and sustainable growth.

Conventional validation processes, however, are generally carried out manually, which can lead to several drawbacks and negative outcomes. Manual validation is time-consuming, labor-intensive, and prone to human error, increasing the risk of overlooking critical issues or vulnerabilities. Moreover, manual processes lack scalability and agility, making it challenging to keep pace with the dynamic nature of cloud environments and software deployments. This approach also hinders collaboration among teams and slows down the release cycle, impeding innovation and competitive advantage. Additionally, manual validation may result in inconsistencies in auditing and compliance reporting, potentially exposing organizations to various risks, such as regulatory fines, legal liabilities, and reputational damage.

In today's fast-paced digital landscape, relying on manual validation processes poses significant challenges and limitations, underscoring the need for automated solutions to streamline validation workflows and ensure the integrity and security of cloud operations and software deployments. Accordingly, there exists a need for attestation engine(s) for validating compliance and provenance of cloud operations and software prior to deployment.

The information provided in this section is presented as background information and serves only to assist in any understanding of the present disclosure. No determination has been made and no assertion is made as to whether any of the above might be applicable as prior art with regard to the present disclosure.

Overview

Technology is disclosed herein for systems and techniques for providing attestation engines. In an aspect, an attestation engine is provided to validate compliance of one or more assets with respective policies. As described below, policies encompass the range of standards, policies, and regulations that govern asset deployment within the software and/or cloud-computing space. As such, the attestation engine may respond to a request to deploy one or more assets, which may be submitted by, for instance, a DevOps platform. Based on the request, the attestation engine may determine whether one or more assets are compliant with the respective policies. For example, the attestation engine may determine whether there is a valid token associated with the assets.

If the attestation engine determines that there is not a valid token associated with the assets, the attestation engine may query a security (or other) system to request analysis of the assets. The security or other system may indicate whether or not the assets pass a respective validation process. If the assets pass the validation process, the attestation engine may receive such an indication and generate a token certifying that the assets are compliant with the respective policies. Once the token is generated or as part of the tokenization process, the attestation engine may assign the token to the assets. As described below, this may include a hashing process in which a hash value is associated with an asset identifier unique to the assets.

Once the token is generated by the attestation engine, the assets may be deployed. Throughout the assets' deployment, compliance checks may be performed to ensure that the assets remain compliant with previous or current policies. As described below, the assets may become non-compliant during deployment due to a variety of reasons, such as configuration drift. As such, compliance checks may be performed, by for example the security system, to monitor the assets. As part of the compliance checks, the attestation engine may validate the assets as compliant with the policies based on the token. For example, the attestation engine may determine whether the token is still valid and, in some cases, whether revalidation of the assets is required. If the token is no longer valid and/or revalidation of the assets is required, the attestation engine may revoke the token until the assets pass the revalidation process. When the assets pass the revalidation process, the token may be reissued.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 6 shows an example computing device suitable for providing an attestation engine and its related functions, according to an embodiment herein.

Figure 1:
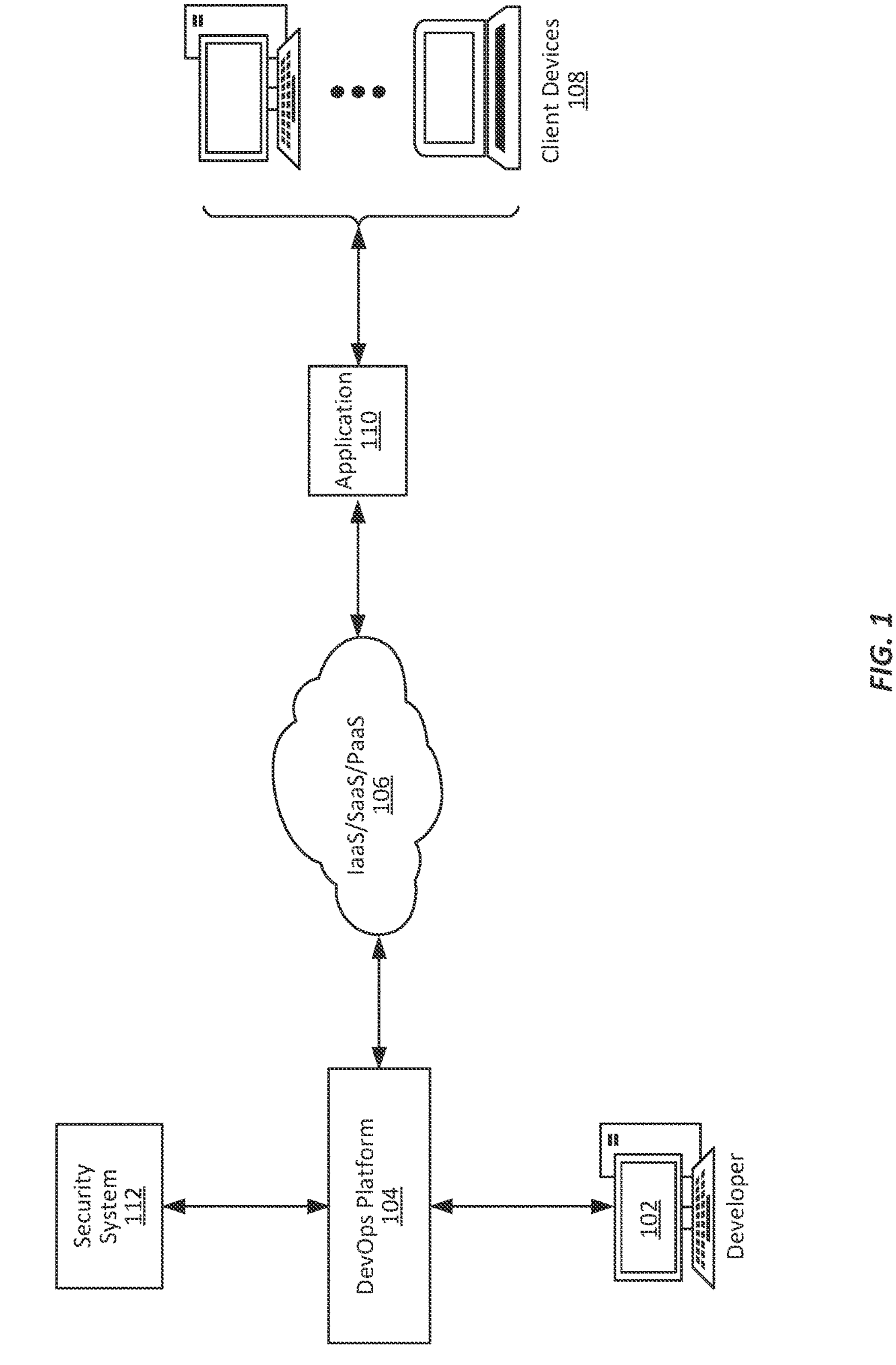
FIG. 1 illustrates an example operational environment in which assets may be deployed, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Cloud-based and hybrid operations have become increasingly common in today's business landscape, revolutionizing the way organizations operate and deliver services. Leveraging the power of cloud computing, businesses are able to scale their operations efficiently, accessing vast computing resources on demand without the need for substantial upfront investment in hardware infrastructure. Furthermore, hybrid operations, which combine both on-premises and cloud-based systems, offer organizations the flexibility to manage their data and workloads seamlessly across multiple environments, optimizing performance and cost-effectiveness. This shift towards cloud-based and hybrid operations reflects a growing recognition of the importance of agility, scalability, and resilience in the face of rapidly evolving market dynamics and technological advancements. As businesses continue to embrace digital transformation, cloud-based and hybrid approaches are poised to play an increasingly pivotal role in driving innovation and competitiveness across industries.

Cloud-based and hybrid operations rely heavily on Infrastructure as a Service (IaaS), Software as a Service (SaaS), and Platform as a Service (PaaS) systems to deploy software and manage cloud operations effectively. With IaaS, organizations can utilize virtualized computing resources such as servers, storage, and networking infrastructure, typically on a pay-as-you-go basis, eliminating the need for costly hardware procurement and maintenance. This enables businesses to quickly provision and scale resources based on demand, optimizing performance and reducing operational overhead. Additionally, PaaS offerings provide a comprehensive development and deployment environment, allowing organizations to build, test, and deploy applications seamlessly without worrying about the underlying infrastructure. By leveraging IaaS and PaaS systems, businesses can accelerate time-to-market, improve collaboration, and drive innovation, empowering them to stay ahead in today's fast-paced digital economy.

Developers may leverage DevOps platforms to streamline the process of generating and deploying software via IaaS and PaaS systems. DevOps practices emphasize collaboration and automation between development and operations teams, aiming to shorten development cycles and increase deployment frequency. Through a DevOps platform, developers can automate various aspects of the software development lifecycle, including code integration, testing, deployment, and monitoring. By integrating with IaaS and PaaS systems, such platforms enable seamless provisioning of infrastructure resources and deployment of applications across different environments. This not only accelerates the development process but also ensures consistency and reliability in software delivery. Furthermore, DevOps platforms facilitate continuous feedback and improvement, allowing developers to iterate on their code and infrastructure rapidly in response to changing requirements or feedback from users. Ultimately, by embracing DevOps practices and leveraging IaaS and PaaS systems, developers can deliver high-quality software more efficiently, driving innovation and business success.

To ensure the security of software prior to deployment and to monitor for compliance during deployment, developers typically employ manual evaluation and monitoring of software code. This involves thorough code reviews, where developers scrutinize the code for vulnerabilities, adherence to coding standards, and compliance with security policies. In some cases, developers may utilize tools and techniques such as static code analysis, vulnerability scanning, and penetration testing to identify and mitigate security risks. Throughout the deployment process, developers continuously monitor the software for compliance with industry regulations, security standards, and organizational policies.

Despite the importance of manual code evaluation and monitoring for ensuring security and compliance, several challenges arise from this approach. Firstly, manual processes are inherently time-consuming and resource-intensive, often slowing down the development and deployment pipeline. As software projects scale and become more complex, the manual review becomes increasingly burdensome, leading to potential bottlenecks and delays in the release cycle. Moreover, human error is inevitable, and manual evaluation may overlook critical vulnerabilities or compliance issues, exposing the software to security risks and regulatory penalties. Additionally, maintaining consistency and standardization across manual reviews can be challenging, especially in distributed development teams or when dealing with a large codebase. As a result, organizations may struggle to enforce uniform security practices and ensure compliance across all software components.

To address these issues with ensuring policy and regulatory compliance, example attestation engines are provided herein. In particular, example attestation engines provided herein can be integrated into DevOps pipelines to generate tokens which validate the validity, compliance, and provenance of deployed software. As will be described in greater detail below, the attestation engines provide a cryptographically secure technique for authenticating provenance and validation of a given deployment or committed instance of cloud resources, including storage, network, compute, and applications as "compliant" with a given sent of policies or requirements. Because the attestation engine automatically generates a token responsive to validation of a respective deployment and monitors the validity of a token based on the underlying set of policies, the attestation engine enables faster, more accurate, and scalable security measures.

By providing a secure and on-going approach to security and compliance, the attestation engine minimizes the risk of security compromises and ensures the integrity and confidentiality of sensitive data and asset deployment. As will be described in greater detail below, the attestation engine may monitor the validity of a token throughout the lifecycle of a set of assets. If the attestation engine determines that the token has expired or that the assets are no longer compliant with the underlying policies, the attestation engine may revoke the token until the assets return to compliance. As can be appreciated, by integrating security and compliance checks into the development and deployment pipelines, the attestation engine helps establish a culture of security-consciousness and ensures that security considerations are prioritized at every stage of the software development lifecycle.

Beyond ensuring assets are compliant with underlying policies, the attestation engine also validates the ownership and provenance of assets. As can be appreciated, by ensuring the authentication of ownership and provenance of software code the attestation engine safeguards against unauthorized modifications and provides accountability in the development process, thereby enhancing security and compliance measures. For example, providing confidence in the validity, compliance, and provenance of software code is of utmost importance for organizations, particularly within restrictive environments like government spaces. In such environments, where security and regulatory compliance are paramount, the integrity and origin of software code directly impacts the safety and effectiveness of critical systems and operations. Customers rely on assurance that the software they deploy adheres to stringent standards, meets regulatory requirements, and originates from trusted sources. Without this confidence, there is an increased risk of security breaches, data compromise, and regulatory violations, all of which can have severe consequences.

As such, the attestation engine provides a transparent processes for verifying the validity, compliance, and provenance of software code that are essential for building trust, ensuring accountability, and maintaining the integrity of systems within software environments, restrictive and open alike. Accordingly, the attestation engine not only enhances security posture but also fosters innovation and collaboration by providing a foundation of trust upon which organizations can confidently deploy and utilize software solutions.

Turning now to the Figures, FIG. 1 illustrates an example operational environment 100 in which one or more assets may be deployed, according to an embodiment herein. In the illustrated example, one or more developers 102 may leverage a DevOps platform 104 for development, deployment, and management of assets in cloud-based operations. As those skilled in the art readily appreciate, the DevOps platform 104 may provide a centralized environment where development and operations teams collaborate closely, streamlining the entire asset development lifecycle. Through automation and integration with cloud services, the DevOps platform 104 enables the developers 102 to efficiently build, test, and deploy applications across various cloud environments. For example, the DevOps platform 104 facilitates continuous integration and continuous deployment (CI/CD) pipelines, automating the process of code integration, testing, and deployment, thereby accelerating time-to-market and ensuring the reliability of asset releases.

As used herein, the term "assets" refers to the various components, assets, and entities utilized within a computing environment to facilitate the development, deployment, and operation of software applications. These assets encompass a broad spectrum, including but not limited to computing instances, virtual machines, storage, networking infrastructure, code repositories, libraries, and configurations. Assets serve as building blocks that developers leverage to create, test, deploy, and maintain software solutions effectively. They enable the allocation of computational power, storage capacity, and network connectivity required for executing software tasks and services. Additionally, assets encompass the source code, libraries, and dependencies necessary for software development, as well as the runtime environments and configurations essential for software execution. Overall, assets in the context of software represent the foundational elements that enable the functioning and management of software systems within computing environments.

Once a respective asset (e.g., software, instance) is in a state for deployment, the developers 102 may interact with one or more of IaaS/SaaS/PaaS systems 106 for release into a cloud-environment or operation. It should be appreciated, that while the following discussion is made with respect to IaaS/SaaS/PaaS systems 106, the description is equally applicable to traditional datacenter contexts, such as those that implement modern Software Deployment Life Cycle (SDLC) practices like CI/CD.

The DevOps platform 104 may orchestrate the interaction between IaaS/SaaS/PaaS systems 106 to deploy the asset finalized by the developers 102 in cloud-based operations. For example, the DevOps platform 104 may leverage the IaaS to provision and manage the underlying infrastructure resources required for deploying the asset, such as virtual machines, storage, and networking components. This allows the developers 102 to dynamically allocate and scale resources based on application needs, optimizing performance and cost-efficiency. Meanwhile, PaaS systems provide a comprehensive development and deployment environment, enabling developers to build, test, and deploy applications without worrying about the underlying infrastructure. The DevOps platform 104 seamlessly integrates with these PaaS systems, automating the deployment process and ensuring consistency across different environments. Through CI/CD pipelines, the DevOps platform 104 automates the building, testing, and deployment of software, facilitating rapid and reliable software releases.

Once the asset is deployed, one or more client devices 108 may interact with the asset as it is integrated into an application 110. In particular, the client devices 108 may interact with the application 110 as it is provisioned and managed by the IaaS/SaaS/PaaS systems 106. Broadly speaking, the client devices 108 may access and interact with the application 110 in a cloud environment by, for example, communicating with the application 110 via one or more internets and intranets, the Internet, wired and wireless networks, local area networks (LANs), wide area networks (WANs), or any other type of network or combination thereof. Examples of the client devices 108 may include personal computers, tablet computers, mobile phones, gaming consoles, wearable devices, Internet of Things (IoT) devices, and any other suitable devices, of which computing apparatus 691 in FIG. 6 is also broadly representative.

Within the cloud environment, the IaaS/SaaS/PaaS system 106 may dynamically provision and manage the necessary resources, such as servers, databases, and networking components to support the application's 110 operation. As client requests are received from the client devices 108 are processed by the application's 110 backend logic, the IaaS/SaaS/PaaS system 106 scales resources in real-time to accommodate varying demand levels, ensuring optimal performance and reliability. Subsequently, the application 110 may generate a response based on the client's request, which is then delivered back to the client devices 108 over secure networking channels. As is appreciated, the client devices 108 may interact with the application's 110 user interface to view results, input data, or perform additional actions, initiating a cycle of interaction and response facilitated by the cloud-based infrastructure. Throughout this process, the IaaS/SaaS/PaaS systems 106 continually adjusts resources to meet changing demand, enabling seamless and efficient interaction with the application 110 in the cloud environment.

Prior to deployment of assets, the developers 102 may interact with a security system 112 to ensure that the assets are compliant with respective policies and regulations. As those in the art readily appreciate, assets, such as software, are often required to adhere to various policies and regulations to ensure compliance with industry standards and legal requirements. For instance, in the healthcare sector, software must comply with the Health Insurance Portability and Accountability Act (HIPAA) to safeguard patient data privacy and security. Similarly, financial software must adhere to regulations such as the Payment Card Industry Data Security Standard (PCI DSS) to protect sensitive payment information. In addition to industry and legal regulations, organizations often have governing policies as well to which assets are required to adhere to. Compliance with these policies and regulations (hereafter "policies") is essential to mitigate risks, protect user privacy, and uphold trust in software applications across different industries.

In addition to validating software for policy and regulation compliance (hereinafter "policy compliance"), the security system 112 may also validate and verify the assets' provenance. Authenticating assets and verifying its provenance are critical steps, particularly within restricted environments, as they ensure that only trusted and authorized software is deployed. By confirming the authenticity and origin of software, organizations can mitigate the risk of malicious code infiltration, maintain the integrity of systems, and uphold regulatory compliance. In restricted environments such as government agencies or highly regulated industries, authenticating software and verifying its provenance are essential safeguards against security breaches, data compromise, and potential threats to national security or sensitive information.

As noted above, conventionally, to ensure policy compliance and verify provenance, the security system 112 may include one or more workers, such as the developers 102, who manually check the assets prior to deployment and then may continue to spot-check the assets once executed to ensure continued compliance. To address the challenges that arise from conventional compliance techniques, the security system 112 may include or be in operable communication with an attestation engine as described below.

Figure 2:
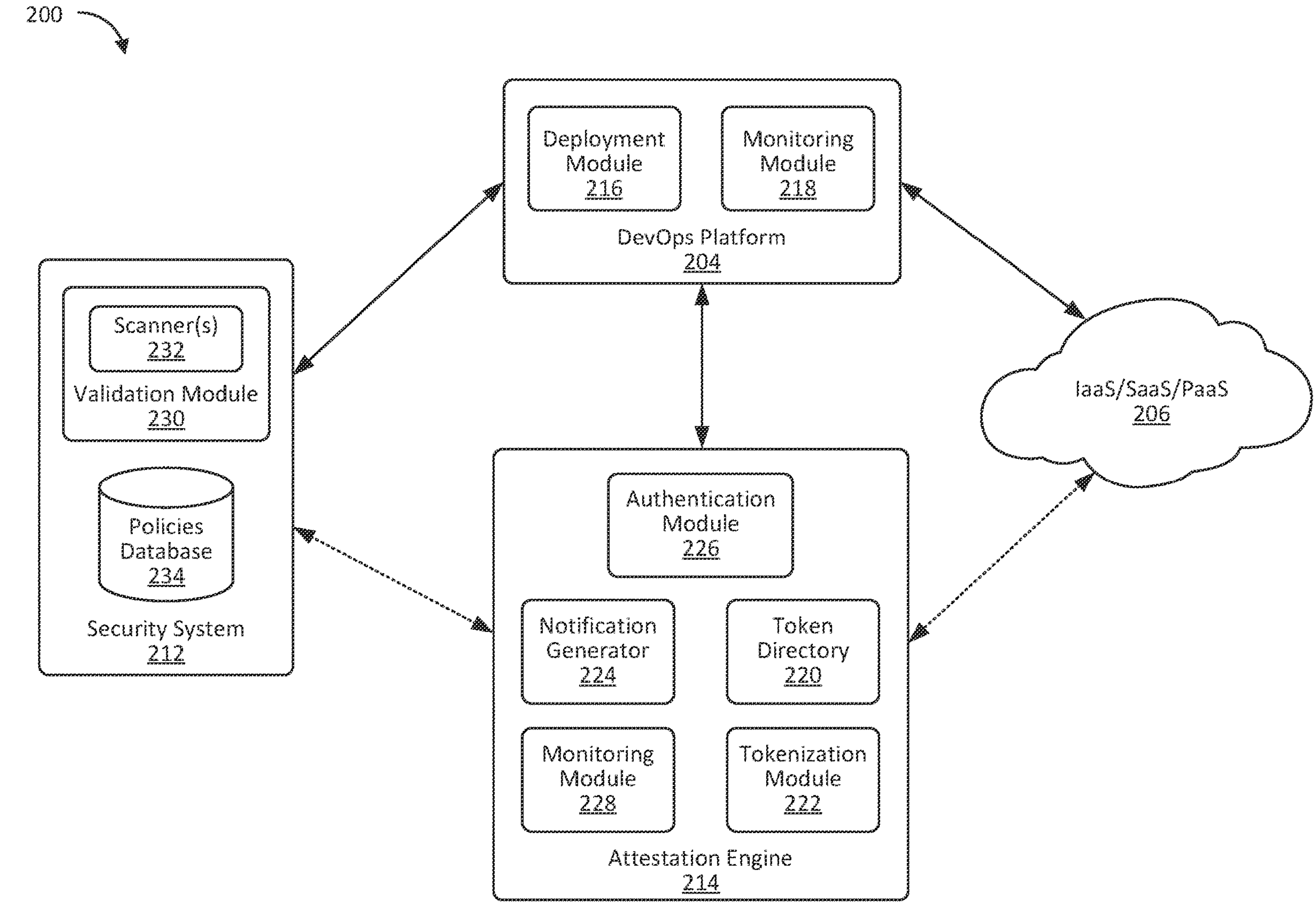
FIG. 2 illustrates an example operational environment including an attestation engine, according to an embodiment herein.

Referring now to FIG. 2, an example operational environment 200 including an attestation engine 214 is illustrated, according to an embodiment herein. The operational environment 200 may be the same or similar to the operational environment 100 by, for example, including a DevOps platform 201, IaaS/SaaS/PaaS systems 206, and a security system 212, which may be the same or similar to the DevOps platform 101, the IaaS/SaaS/PaaS systems 106, and the security system 112, respectively.

Figure 3:
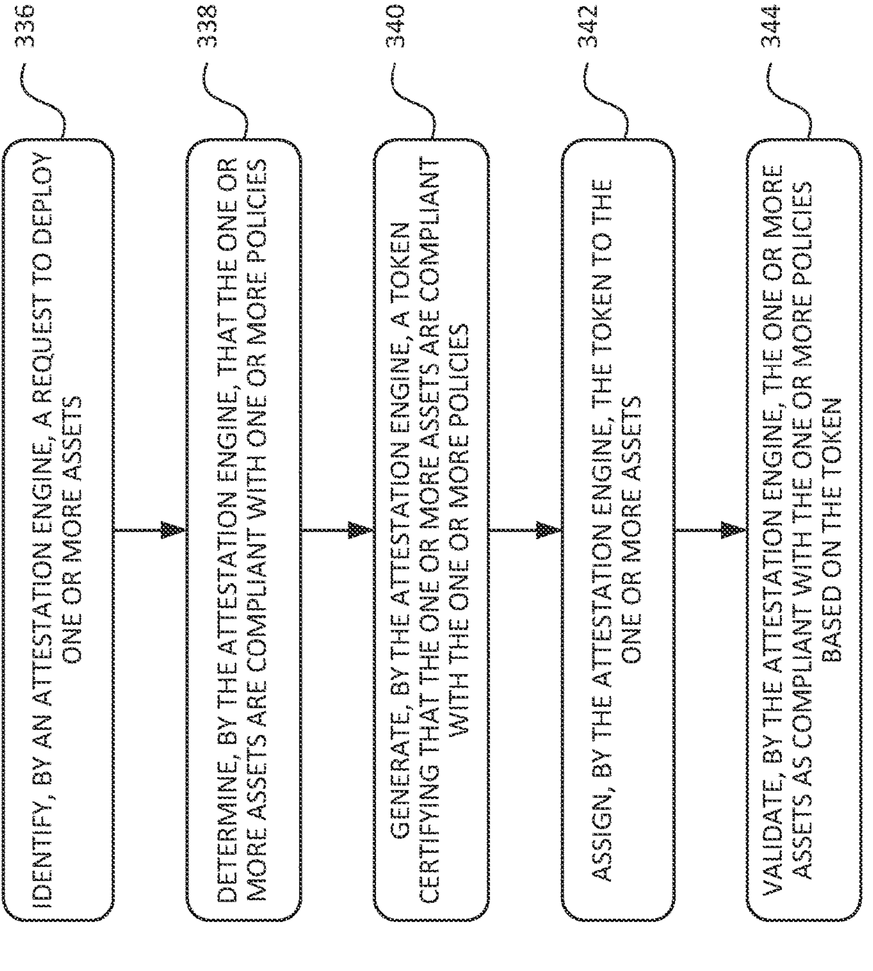
FIG. 3 illustrates an example attestation engine process, according to an embodiment herein.

For ease of explanation, FIG. 2 is described in conjunction with FIG. 3, which provides an example attestation engine process, in particular a process 300 for providing the attestation engine 214 and one or more of its functions, according to an embodiment herein. While FIG. 3 is described with relation to FIG. 2, it should be appreciated that components, elements, and steps from any other Figures described herein may be equally applicable.

As noted above, the DevOps platform 204 may be used by developers, such as the developers 102, for generation, deployment, and management of cloud-based operations. For example, the DevOps platform 204 may include a deployment module 216 via which developers may generate and deploy assets. The deployment module 216 may include automated pipelines or integrated tools that allow for efficient asset production, such as generation of code, configurations, instances, and deployment packages.

Prior to deployment, an asset (or a group of assets) may be validated to ensure that it is compliant with respective policies. To validate compliance of an asset, the operational environment 200 may include an attestation engine 214. It should be appreciated that although, the attestation engine 214 is illustrated as separate from the security system 212 and the DevOps platform 204, in some cases, the attestation engine 214 may be part of the security system 212 and/or the DevOps platform 204.

When the asset is ready for deployment, the attestation engine 214 may receive a request to deploy the one or more assets (336). The request may include a request to validate the assets. In some embodiments, the request may be received from the DevOps platform 204 or from the security system 212. To validate the assets, the attestation engine 214 may determine whether the assets are compliant with one or more respective policies (338). To determine whether the assets are compliant with respective policies, the attestation engine 214 may first determine whether a token has been issued for the assets previously or if there is a valid token associated with the assets.

As shown, the attestation engine 214 may include an attestation directory 220. The attestation directory 220 may include a database that stores tokens as they are issued by the attestation engine 214. As will be described in greater detail below, when a token is issued, the attestation engine 214 may link or otherwise assign the token to the respective assets. The assignment of token to the assets is then stored and/or indexed in the attestation directory 220. If the attestation engine 214 determines that no token has been issued for the assets, and thus the assets are not validated, the attestation engine 214 may communicate with the security system 212 requesting validation of the assets. For example, the attestation engine 214 may transmit a request to the security system 212 to validate the assets.

When the security system 212 receives the request to validate the assets, the security system 212 may perform one or more validation processes. In particular, a validation module 230 may perform one or more validation processes on the assets to ensure that the assets are compliant with one or more respective policies, regulations, standards, etc. (hereinafter "policies"). As should be appreciated, the policies may cover a range of policies, depending on the industry, geographical location, and application. For example, the policies may include data privacy laws (such as GDPR or CCPA), industry-specific regulations (like HIPAA for healthcare or PCI DSS for payment process), accessibility standards, and intellectual property rights. The security system 212 may include a policies database 234 which stores policies relevant to the respective application and organization deploying the assets. It should be appreciated that while the policies database 234 is illustrated as part of the security system 212, in some cases, the policies database 234 may be separate from the security system 212, such as hosted by a third party.

To validate the assets, the validation module 230 may include one or more scanners 232. Scanners 232 may include a variety of static code analysis tools and vulnerability scanners that are used to ensure compliance with respective policies. As those skilled in the art readily appreciate, the scanners 232 may analyze codebases and dependencies to identify security vulnerabilities, license violations, and adherence to coding standards. In some cases, the validation module 230 may also use man-power (e.g., developers) to ensure policy compliance.

Upon performing the one or more validation processes, the validation module 230 may determine whether the assets comply or fail to comply with the respective policies. If the assets fail to comply, the security system 212 may generate and send a notification to the DevOps platform 204 of the non-compliance. In contrast, if the assets comply with the policies, the security system 212 may transmit a notification that the assets comply with the policies to the attestation engine 214. In some embodiments, the request to deploy the one or more assets received by the attestation engine 214 may include an indication that the assets passed the validation process performed by the security system 212. In such cases, the attestation engine 214 may use this indication to determine that the assets are compliant with the respective policies.

When the attestation engine 214 determines that the assets comply with the respective policies, the attestation engine 214 may generate a token for the assets (340). In particular, the attestation engine 214 may include a tokenization module 222 for generating the token. The token may certify or otherwise validate the assets as compliant with the policies. The token may also validate the provenance of the assets as from the DevOps platform 204. As should be appreciated, the token may include various information relating to the provenance of the assets, such as the specific development team or developer, the time or date of deployment, etc.

The tokenization module 222 may generate a token based on the assets being validated by the security system 212. To generate the token, the tokenization module 222 may perform a tokenization process. The tokenization process may include a variety of cryptographic techniques, including asymmetric encryption. For example, using a tokenization process, the tokenization module 222 may generate a cryptographic value and link the cryptographic value to the one or more assets as a token. The cryptographic value may be or include hash values, encryption keys, a fingerprint, digital signatures, or other types of cryptographic data.

In an example, the tokenization module 222 may perform a hashing process with the assets. For example, the tokenization module 222 may use a cryptographic hashing algorithm, such as SHA-256 or SHA-512, to generate a hash value. The hashing algorithm may process the assets to create a unique representation or asset identifier that may serve effectively as a digital fingerprint of the token payload. The hash value is then integrated into the token, enabling receipts to verify the authenticity and compliance of the assets. In some cases, the hash value may be the token. As can be appreciated, any alterations to the assets would result in a different hash value, alerting the receipts of potential tampering or unauthorized modification of the assets.

For example, to verify the authenticity or compliance of a respective asset, a user (e.g., developer, consumer) may query the attestation directory 220 to request authentication of the asset. Responsive, the user may receive a generated token that was generated based on a unique identifier associated with the asset (e.g., the asset identifier). The user can then compare the token associated with the asset to the generated token. If the token is the same as the generated token, then the user can validate that the assets are compliant with the respective policies. However, if the token is different than the generated token, the user can determine that the assets may no longer be compliant or an unauthorized event (e.g., fraud, unauthorized change to the underlying assets) may have occurred.

The token may take a variety of forms, such as a token, JSON, a certificate, a cryptographic blob, and the like. Regardless of the form, once generated, the attestation engine 214 may assign the token to the assets (342). For example, as noted above, when the hash value is generated via a hashing process for the assets, the hash value may be assigned or otherwise linked to the generated asset identifiers. The assignment of the token to the assets may be stored in the attestation directory 220.

When the token is generated, the attestation engine 214 may generate a notification of the token generation. For example, the attestation engine 214 may include a notification generator 224. The notification generator 224 may generate a notification that the token is generated authenticating or verifying the compliance of the assets with the respective policies. Once generated, the notification may be transmitted to the DevOps platform 204 indicating that the assets are compliant with the policies. In some cases, the notification may include information relating to the token, such as the assets and the respective policies that the assets are compliant with. The notification may grant authority to deploy the one or more assets based on the compliance of the assets with the respective policies.

Once the assets are granted or assigned a token, the DevOps platform 204 may deploy the assets. In particular, the assets may be deployed to the IaaS/SaaS/PaaS systems 206. As described above, when the assets are deployed to the IaaS/SaaS/PaaS systems 206, clients or customers may interface with the deployed assets via respective applications. Because the deployed asset has been granted a token, the client or customer can be assured that the deployed asset is in compliance with respective policies. The clients and customers can also be assured of the deployed asset's provenance. As noted above, validating a deployed asset's provenance can mitigate security risks, provide insight into quality and reliability, and foster trust between developers, distributers, and users.

The DevOps platform 204 may include a monitoring module 218 to continuously monitor the assets in deployment to ensure on-going compliance. As those skilled in the art may readily appreciate, once deployed, assets often undergo dynamic changes driven by various factors, such as user feedback, bug fixes, feature enhancements, and security updates. While these alterations ensure that the asset remains relevant, efficient, and secure, these alterations may cause the asset to "drift" from its original, validated form. Drift may occur due to the gradual divergence between the actual state of the asset (e.g., due to the alterations) and its originally validated state. Drift can occur due to various factors, such as configuration changes, updates, varying vulnerabilities, or unanticipated events, leading to inconsistencies that may affect the asset's compliance with respective policies.

To monitor deployed assets for drift, the monitoring module 218 of the DevOps platform 204 may communicate with the IaaS/SaaS/PaaS systems 206 to check the deployed asset. In some cases, compliance checks may occur at set time increments, while in other cases, the compliance checks may occur randomly. If the monitoring module 218 identifies a drift for a deployed asset, the monitoring module 218 may request the security system 212 revalidate the drifted deployed asset. In such a case, the monitoring module 218 may communicate with the attestation engine 214 to indicate the drift of the deployed asset. In some cases, the attestation engine 214 may revoke or pause the token for the drifted deployed asset until the asset is revalidated by the security system 212.

The attestation engine 214 may also monitor the deployed assets. In particular, the attestation engine 214 may include a monitoring module 228 that monitors the tokens associated with the deployed assets ("deployed tokens"). The monitoring module 228 may monitor each of the deployed tokens for one or more attestation thresholds associated with the respective deployed token. Attestation thresholds may be thresholds or properties of the token or deployed asset, that when met, require revalidation of the deployed asset. For example, a deployed token may be valid only for a discrete time period, thus having an attestation threshold of being valid only for that time period. After that time period (e.g., attestation threshold) is exceeded, the deployed token may expire. Once the token expires, the token may be revoked by the attestation engine 214.

Other examples of attestation thresholds may include a percentage drift of the deployed asset (e.g., 10% drift from the original state), a change in underlying policies, a number of interactions by users with the deployed assets, a change in licensing, a change in vulnerabilities, a change of components, bugs, functionality upgrades, cost run overs, anomalous activity, unintentional Denial of Service (DoS) activities, unintentional exposure, data leakage (DLP), underlying architecture changes, and the like.

Once an attestation threshold is exceeded, the attestation engine 214 may revoke the token. In some cases, revoking the token may include updating a status of the token within the attestation directory 220 as revoked or not valid. In addition to revoking the token or instead of revoking the token, depending on the application, the attestation engine 214 may generate a notification that the attestation threshold has been exceeded. In particular, the notification generator 224 may generate a notification that the deployed assets require revalidation. In some cases, the notification may include a notice that the token is revoked and/or information on what actions prompted the revocation or requirement for revalidation. For example, if the token expires, the notification may indicate that the token expired due to the time period required by an underlying policy. The notification may be transmitted to the DevOps platform 204 to notify the developers of the revalidation requirement. It should be appreciated that while the discussion herein focuses on developers, in other cases, various operations or owners associated with a respective business or system may be notified or participate in the attestation engine process.

In some cases, a notification may also be sent to the security system 212. For example, the attestation engine 214, upon identifying a deployed asset requiring revalidation (e.g., by an attestation threshold being exceeded), may transmit a request to the security system 212 to revalidate the assets. Responsive to the request, the validation module 230 may perform the revalidation process and transmit the results to the attestation engine 214. If the deployed asset passes the revalidation process, the attestation engine 214 may reissue the revoked token (if the token was revoked) or update the token within the attestation directory 220 as revalidated. For example, if the token expires, the attestation engine 214 may request the assets to be revalidated. While the assets are being revalidated, the attestation engine 214 may not revoke the token and instead only revoke the token if the assets fail the revalidation process. If the assets pass the revalidation process, the attestation engine 214 may update the attestation directory 220 to indicate the revalidation, which may impact the attestation thresholds of the token (e.g., updating an expiration date based on the revalidation process).

In addition to ensure on-going compliance, the monitoring module 218 and/or the monitoring module 228 may also monitor for unauthorized events. Unauthorized events may include compromise, fraud, resource abuse, BitCoin mining, and the like. If one or both of the monitoring modules 218 and 228 identify an unauthorized event, the attestation engine 214 may revoke the token and, in some cases, generate a notification by the notification generator 224 of the unauthorized event.

Revocation of a token may impact the ability of the respective assets to be deployed or may require decommissioning of the respective assets. For example, the DevOps platform 204, or in some cases the IaaS/SaaS/PaaS systems 206 may communicate with the attestation engine 214 to validate assets as compliant with respective policies as part of a deployment or management process. To validate the assets, the DevOps platform 204 (or the IaaS/SaaS/PaaS systems 206) may request authentication or proof of the token from the attestation engine 214. Upon receiving the request, the attestation engine 214 may authenticate or validate the asset as compliant with the respective policies based on the associated token (344). That is, the authentication module 226 may query the attestation directory 220 based on the assets, for example using a unique identifier associated with the assets, to determine whether there is a valid token issued for the assets. If there is a valid token (e.g., not expired or revoked) for the assets, the authentication module 226 may validate the assets as compliant with the respective policies. In some cases, authenticating the assets may include generating and transmitting a notification of the authentication to the requesting party. As can be appreciated, authenticating assets may be performed at any stage of the deployment and management process, such as the initial deployment of an asset, while the asset is deployed, or when an update is being committed to the asset.

In some cases, there may be multiple tokens issued for a given asset. For example, if the asset is part of an asset package containing multiple different assets. Each asset may be issued a token authenticating that asset as compliant with respective policies. In addition to the token granted to each asset, the asset package as a whole may also be issued a token. This token may be referred to as a package token or governing token. The governing token may validate the package as compliant with respective policies. As can be appreciated, individual assets within a package may be governed by different policies than the package as a whole. By issuing individual tokens to each asset and a governing token to the package as a whole, when modifications or actions are made with respect to an individual asset, the attestation engine 214 can identify the respective asset that is affected by the modification or action. In an illustrative example, if a package has ten assets, each of which is compliant with a different policy, having different attestation thresholds, the attestation engine 214 can monitor each individual asset for compliance without impacting the other assets. If one of the ten assets exceeds an attestation threshold, the attestation engine 214 can request revalidation of that asset without impacting the remaining assets. Additionally, the governing asset of the asset package containing the ten assets may validate that the assets as combined together and implemented is compliant. By segmenting the compliance by asset and package, authenticating and managing the assets once deployed can be discretely monitored and managed.

Figure 4:
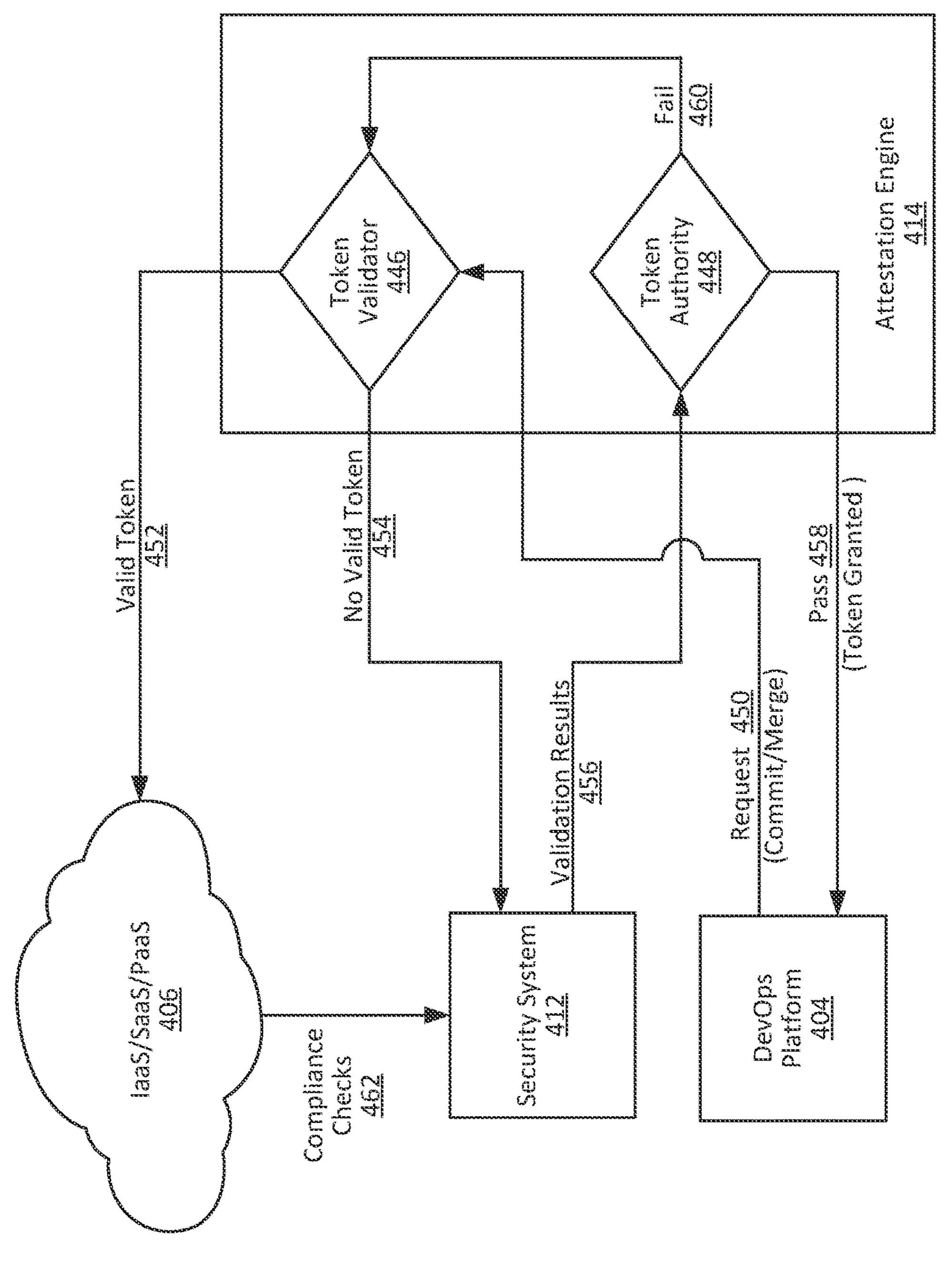
FIG. 4 illustrates an example operational flow including an attestation engine, according to an embodiment herein.

Referring now to FIG. 4, an example operational flow 400 including an attestation engine 414 is illustrated, according to an embodiment herein. The operational flow 400 illustrates how the attestation engine 414, which may be the same or similar to the attestation engine 214 issues and manages tokens to validate assets as they are deployed by a DevOps platform 404. The DevOps platform 404 may be the same or similar to the DevOps platform 204, by for example, deploying assets to IaaS/SaaS/PaaS systems 406, which may be the same or similar to the IaaS/SaaS/PaaS systems 206.

As shown, the DevOps platform 404 may transmit a request 450 to the attestation engine 414. The request 450 may be a merge request, a commit, a pull request, or a push request, depending on the asset. Regardless, the request 450 may include a request to validate the asset associated with the request 450. For some examples, the request 450 may be a request to deploy one or more assets, while in other examples, the request 450 may be a request to commit changes to assets that are already deployed.

The attestation engine 414 may include a token validator 446. The token validator 446 may be the same or similar to the authentication module 226. For example, the token validator 446 may receive the request 450 from the DevOps platform 404 and determine whether there is a valid token associated with the assets identified in the request. In other words, the token validator 446 validates whether the assets are compliant with respective policies and thus there is a valid token for the assets. If the token validator 446 determines that there is a valid token 452 for the assets, then the request 450 may be granted and the assets may be deployed to the IaaS/SaaS/PaaS systems 406.

However, if the token validator 446 determines that there is no valid token 454 for the assets, and thus the assets are not validated as compliant with respective policies, the attestation engine 414 may request validation (or revalidation) of the assets, depending on the status of the token. As can be appreciated, if a token has not been issued for the assets yet, then the attestation engine 414 may request validation of the assets. However, if a token has been issued previously but the token is currently invalid, then the attestation engine 414 may request revalidation of the assets. In some cases, the validation process may be the same as the revalidation process, while in other cases, the revalidation process may differ from the validation process, by for example, being a truncated or shortened validation process based on the previous validation.

In some embodiments, the attestation engine 414 may request validation of the assets by a security system 412. The security system 412 may be the same or similar as the security system 212. For example, the security system 412 may perform a validation process (or revalidation process) on the assets based on respective policies associated with the assets, as described above. Once the validation process is performed, the security system 412 may transmit the validation results 456 to the attestation engine 414.

The attestation engine 414 may include a token authority 448. The token authority 448 may be a system or service that generates and manages tokens for the attestation engine 414. For example, the token authority 448 may be or include the tokenization module 222. In some cases, the token authority 448 may be or include a Security Token Service (STS) that issues and manages tokens according to WS-Trust and WS-Federation protocols. As such, upon receipt of the validation results 456, the token authority 448 may generate a token if the assets pass 458 the validation process. Depending on the previous state of the token (e.g., not issued yet or revoked), token authority 448 may reissue the token based on the pass 458.

If the validation results 456 indicate that the assets fail 460 the validation (or revalidation) process, then token authority 448 may communicate the fail 460 with the token validator 446. Again, depending on the previous state of the token, the token validator 446 may revoke a previously valid token based on the fail 460 or may deny the request 450 to grant a token based on the fail 460. In some cases, the fail 460 may be recorded in an attestation directory, such as the attestation directory 220. As can be appreciated, it may be useful for security purposes to track the fails 460 for respective assets.

As noted above, if the validation results 456 indicate that the assets pass 458 the validation (or revalidation) process, then the attestation engine 414 may communicate the pass 458 to the DevOps platform 404. In some cases, the communication may include a notification of the pass 458. Responsive to the pass 458, a token may be issued for the assets meaning that the request 450 may be granted. As illustrated, once the pass 458 is achieved, the DevOps platform 404 may be approved to deploy the assets, which may include resubmitting the request 450, or submitting as subsequent request 450, to the attestation engine 414. As described above, when the token validator 446 receives the request 450, the token validator 446 may determine whether there is a valid token for the asset. Here, since the token was granted responsive to the pass 458, the token validator 446 may determine that there is a valid token 452 for the assets and thereby validate the assets as compliant with the respective policies. Since there is a valid token 452, the token validator 446 may grant deployment of the assets to the IaaS/SaaS/PaaS systems 406.

Once assets are deployed, the security system 412 may perform one or more compliance checks 462. In some cases, the compliance checks 462 may be performed on a continuous basis. As part of the compliance checks, the security system 412 may perform revalidation processes on the respective assets. In some cases, the security system 412 may check the attestation thresholds for tokens associated with respective assets. In such cases, the security system 412 may include a module similar to the monitoring module 228. Depending on the compliance check performed, which may include a check of the attestation thresholds of the tokens or a revalidation process for the assets, the security system 412 may generate the validation results 456 for the respective assets. As described above, the validation results 456 may be communicated to the token authority 448 which may either maintain the previously issued valid token or may revoke a valid token, depending on the validation results 456.

Figure 5:
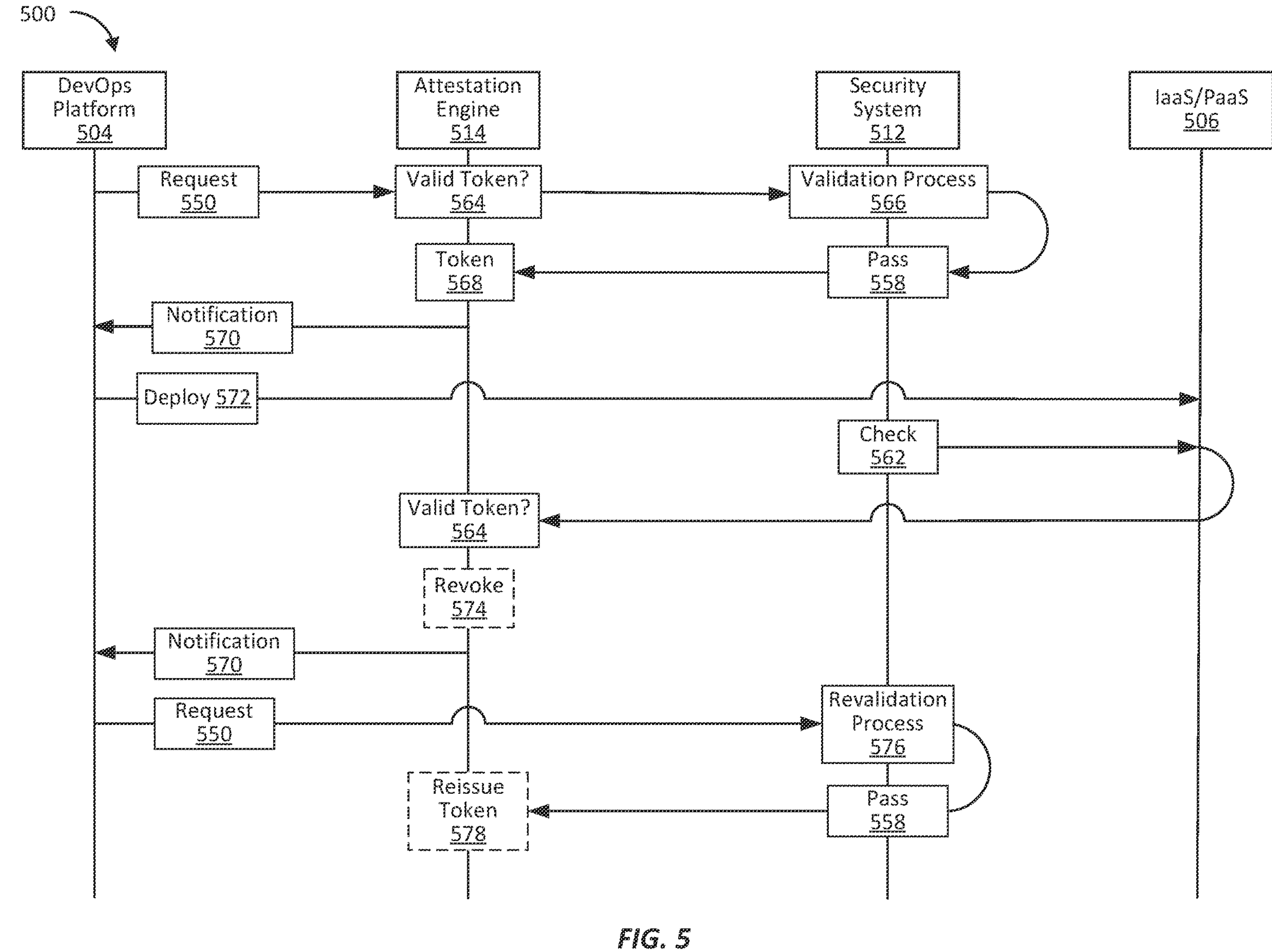
FIG. 5 illustrates an example operational flow for authenticating assets using an attestation engine, according to an embodiment herein.

Referring now to FIG. 5, an example operational flow 500 for authenticating assets using an attestation engine 514 is illustrated, according to an embodiment herein. The operational flow 500 includes a request 550, which may be the same or similar to the request 450, being transmitted from a DevOps platform 504 to an attestation engine 514, which may be the same or similar to the DevOps platform 404 and the attestation engine 414, respectively. Upon receipt of the request 550, the attestation engine 514 may determine whether there is a valid token 564 for the assets associated with the request 550. For example, the attestation engine 514 may include the authentication module 226 and/or the token validator 446, which may perform an authentication process based on the request 550. From the authentication process, the attestation engine 514 may determine that there is no valid token issued for the assets associated with the request 550. For example, either no token has been issued previously or a previously issued token is revoked.

Based on no valid token being determined at 564, the attestation engine 514 may query a security system 512, which may be the same or similar to the security system 412.

In particular, the attestation engine 514 may request the security system 412 to perform a validation process 566 on the assets associated with the request 550. As illustrated, based on the validation process 566, the security system 512 may determine that the assets pass 558. As such, the security system 512 may transmit an indication of the pass 558 to the attestation engine 514.

Responsive to receiving an indication of the pass 558, the attestation engine 514 may generate or otherwise issue a token 568 for the respective assets. As noted above, the token 568 may validate that the assets are compliant with respective policies. Once the token 568 is issued, the attestation engine 514 may associate or otherwise assign the token 568 to the assets, such as by one or more of the above described tokenization processes.

The attestation engine 514 may then generate and transmit a notification 570 to the DevOps platform 504 indicating that the token 568 is issued and the request 550 is granted. In some embodiments, the security system 512 may generate and/or transmit the notification 570 to the DevOps platform 504. The notification 570 may include information relating to the policies that the assets are compliant with, as well as indicating attestation thresholds for the token 568. For example, the notification 570 may indicate that the token is only valid for 6 months or an attestation threshold of only 2 modifications may be made before revalidation is required. In some embodiments, such information may also be part of metadata associated with the token 568. Responsive to receiving the notification 570, the DevOps platform 504 may deploy 572 the assets via IaaS/SaaS/PaaS systems 506, as described above.

The security system 512 may perform compliance checks 562 at various times once the assets are deployed. As such, the security system 512 may query the IaaS/SaaS/PaaS systems 506 to perform the checks 562. As part of the checks 562, the attestation engine 514 may be queried to validate the assets. For example, as illustrated, the attestation engine 514 may determine whether there is a valid token 564 for the assets associated with a respective check 562. If the attestation engine 514 determines that there is not a valid token, or that one or more attestation thresholds are met or exceeded, then the attestation engine 514 may revoke 574 the token.

The attestation engine 514 may subsequently generate a notification 570. The notification 570 may indicate the results of the checks 562 for respective assets. For example, if the token is revoked 574, then notification 570 may notify the DevOps platform 504 of the token revocation and may indicate that revalidation is required for the assets. In such a case, the DevOps platform 504 may submit a request 550 to the security system 512 to revalidate the assets. The security system 512 may perform a revalidation process 576 and based on the results, the token may be maintained as revoked 574 or reissued 578. In the illustrated example, the security system 512 may indicate that the assets pass 558 the revalidation process 576. As such, the security system 512 may transmit an indication of the pass 558 to the attestation engine 514, which in turn may reissue the token 578 as a valid token.

Referring now to FIG. 6, is a diagram of a system 600 configured to implement an attestation engine, according to an embodiment herein. The system 600 may be an example of an apparatus including a computing apparatus 691 that is representative of any system or collection of systems in which the various processes, systems, programs, services, and scenarios disclosed herein may be implemented. For example, computing apparatus 691 may be an example attestation engine, such as the attestation engine 214, 414, or 514, a client device, such as the client devices 108, or any of the subcomponents depicted in system 200 of FIG. 2. Examples of computing apparatus 691 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 691 may be implemented as a single apparatus, system, or device or may be implemented in a distributed manner as multiple apparatuses, systems, or devices. Computing apparatus 691 may include, but is not limited to, processing system 696, storage system 693, software 695, communication interface system 697, and user interface system 699. Processing system 696 may be operatively coupled with storage system 693, communication interface system 697, and user interface system 699.

Processing system 696 may load and execute software 695 from storage system 693. Software 695 may include an attestation engine 692, which may be representative of any of the operations for providing an attestation engine or any of its related functions, as discussed with respect to the preceding figures. When executed by processing system 696, software 695 may direct processing system 696 to operate as described herein for at least the various processes, such as the process 300, operational scenarios, and sequences discussed in the foregoing implementations. Computing apparatus 691 may optionally include additional devices, features, or functionality not discussed for purposes of brevity.

In some embodiments, processing system 696 may comprise a micro-processor and other circuitry that retrieves and executes software 695 from storage system 693. Processing system 696 may be implemented within a single processing device but may also be distributed across multiple processing devices or sub-systems that cooperate in executing program instructions. Examples of processing system 696 may include general purpose central processing units, graphical processing units, application specific processors, and logic devices, as well as any other type of processing device, combinations, or variations thereof.

Storage system 693 may comprise any memory device or computer-readable storage medium readable by processing system 696 and capable of storing software 695. Storage system 693 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 693 may also include computer readable communication media over which at least some of software 695 may be communicated internally or externally. Storage system 693 may be implemented as a single storage device but may also be implemented across multiple storage devices or sub-systems co-located or distributed relative to each other. Storage system 693 may comprise additional elements, such as a controller, capable of communicating with processing system 696 or possibly other systems.

Software 695 (including the attestation engine 692 among other functions) may be implemented in program instructions that may, when executed by processing system 696, direct processing system 696 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 695 may include additional processes, programs, or components, such as operating system software, virtualization software, or other application software. Software 695 may also comprise firmware or some other form of machine-readable processing instructions executable by processing system 696.

In general, software 695 may, when loaded into processing system 696 and executed, transform a suitable apparatus, system, or device (of which computing apparatus 691 is representative) overall from a general-purpose computing system into a special-purpose computing system as described herein. Indeed, encoding software 695 on storage system 693 may transform the physical structure of storage system 693. The specific transformation of the physical structure may depend on various factors in different implementations of this description. Examples of such factors may include, but are not limited to, the technology used to implement the storage media of storage system 693 and whether the computer-storage media are characterized as primary or secondary storage, as well as other factors.

For example, if the computer-readable storage medium is implemented as semiconductor-based memory, software 695 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 697 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 691 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing an attestation engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; an attestation engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: identify a request to deploy one or more assets; receive an indication that the one or more assets are compliant with one or more policies; generate a token certifying compliance of the one or more assets with the one or more policies; assign the token to the one or more assets; and validate the one or more assets as compliant with the one or more policies based on the token.

Example 2 is the computing apparatus of any previous or subsequent Example, wherein the processor-executable instructions to validate the one or more assets as compliant with the one or more policies based on the token, when executed by the one or more processors, further direct the computing apparatus to: determine one or more attestation thresholds associated with the token; determine that the one or more assets exceed a first attestation threshold of the one or more attestation thresholds; and generate a notification that the one or more assets require revalidation.

Example 3 is the computing apparatus of any previous or subsequent Example, wherein the attestation engine comprises an attestation directory and the processor-executable instructions to assign the token to the one or more assets, when executed by the one or more processors, further direct the computing apparatus to: perform a hashing process on the token and the one or more assets to generate a hash value for the one or more assets; and associate the hash value with the token in the attestation directory.

Example 4 is the computing apparatus of any previous or subsequent Example, wherein the request to deploy the one or more assets is received from a client device, and the processor-executable instructions, when executed by the one or more processors, further direct the computing apparatus to: generate a notification that the token is issued for the one or more assets, wherein the notification grants authority to deploy the one or more assets based on compliance of the one or more assets with the one or more policies; and transmit the notification to the client device.

Example 5 is the computing apparatus of any previous or subsequent Example, wherein the processor-executable instructions, when executed by the one or more processors, further direct the computing apparatus to: determine an expiration of the token; generate a notification of the expiration of the token; receive an indication that the one or more assets have passed a revalidation process based on the expiration of the token responsive to the notification; and reissue the token for the one or more assets based on the revalidation process.

Example 6 is the computing apparatus of any previous or subsequent Example, wherein the processor-executable instructions, when executed by the one or more processors, further direct the computing apparatus to: receive a second request associated with the one or more assets; determine that the token is associated with the one or more assets; and generate a notification that the second request is authorized to proceed based on the token.

Example 7 is the computing apparatus of any previous or subsequent Example, wherein the processor-executable instructions, when executed by the one or more processors, further direct the computing apparatus to: determine an expiration of the token; revoke the token based on the expiration; and generate a notification comprising an indication of the expiration of the token and a revalidation requirement for the one or more assets.

Example 8 is a method comprising: identifying, by an attestation engine, a request to deploy one or more assets; determining, by the attestation engine, that the one or more assets are compliant with one or more policies; generating, by the attestation engine, a token certifying that the one or more assets are compliant with the one or more policies; assigning, by the attestation engine, the token to the one or more assets; and authenticating, by the attestation engine, the one or more assets as compliant with the one or more policies based on the token.

Example 9 is the method of any previous or subsequent Example, wherein assigning, by the attestation engine, the token to the one or more assets comprises: performing, by the attestation engine, a tokenization process based on the token and the one or more assets, wherein the tokenization process generates a cryptographic value for the one or more assets that links the one or more assets to the token.

Example 10 is the method of any previous or subsequent Example, wherein the attestation engine comprises an attestation directory comprising a plurality of tokens and a plurality of asset identifiers, wherein the each of the plurality of asset identifiers is associated with a respective token of the plurality of tokens.

Example 11 is the method of any previous or subsequent Example, wherein determining that the one or more assets are compliant with one or more policies comprises: receiving, by the attestation engine, an indication that the one or more assets are compliant with the one or more policies from a security system.

Example 12 is the method of any previous or subsequent Example, wherein the request to deploy the one or more assets is received from a client device and the method further comprises: generating, by the attestation engine, a notification of the token assignment to the one or more assets based on compliance with the one or more policies; and transmitting, by the attestation engine, the notification to the client device, wherein the notification comprises information on the one or more policies and the one or more assets.

Example 13 is the method of any previous or subsequent Example, wherein the request to deploy the one or more assets is issued by a DevOps platform; and the DevOps platform comprises the attestation engine.

Example 14 is the method of any previous or subsequent Example, wherein authenticating, by the attestation engine, the one or more assets as compliant with the one or more policies based on the token comprises: determining, by the attestation engine, an attestation threshold for the token based on the one or more policies; determining, by the attestation engine, that the one or more assets exceed the attestation threshold; receiving, by the attestation engine, an indication that the one or more assets pass a revalidation process; and reauthenticating, by the attestation engine, that the one or more assets are compliant with the one or more policies based on the token and the revalidation process.

Example 15 is a computer-readable storage medium comprising processor-executable instructions, wherein the processor-executable instructions comprise an attestation engine configured to cause one or more processors to: identify a request to deploy one or more assets; receive an indication that the one or more assets are compliant with one or more policies; generate a token certifying compliance of the one or more assets with the one or more policies; assign the token to the one or more assets; and validate the one or more assets as compliant with the one or more policies based on the token.

Example 16 is the computer-readable storage medium of any previous or subsequent Example, wherein the processor-executable instructions of the attestation engine to validate the one or more assets as compliant with the one or more policies based on the token cause the one or more processors to further execute processor-executable instructions stored in the computer-readable storage medium to: determine one or more attestation thresholds associated with the token; determine that the one or more assets exceed a first attestation threshold of the one or more attestation thresholds; revoke the token based on the first attestation threshold being exceeded; and generate a notification that the one or more assets require revalidation.

Example 17 is the computer-readable storage medium of any previous or subsequent Example, wherein the request to deploy the one or more assets is received from a client device, and the processor-executable instructions cause the one or more processors to further execute processor-executable instructions stored in the computer-readable storage medium to: generate a notification indicating authentication of the one or more assets as compliant with the one or more policies based on the token; and transmit the notification to the client device.

Example 18 is the computer-readable storage medium of any previous or subsequent Example, wherein the processor-executable instructions of the attestation engine to assign the token to the one or more assets cause the one or more processors to further execute processor-executable instructions stored in the computer-readable storage medium to: generate a cryptographic value for the one or more assets based on the token and the one or more assets, wherein the cryptographic value links the one or more assets to the token; and store the cryptographic value in an attestation directory, wherein the attestation engine comprises the attestation directory.

Example 19 is the computer-readable storage medium of any previous or subsequent Example, the processor-executable instructions cause the one or more processors to further execute processor-executable instructions stored in the computer-readable storage medium to: determine an unauthorized event associated with the one or more assets; and revoke the token based on the unauthorized event.

Example 20 is the computer-readable storage medium of any previous or subsequent Example, the processor-executable instructions cause the one or more processors to further execute processor-executable instructions stored in the computer-readable storage medium to: determine an expiration of the token; generate a notification of the expiration of the token; receive an indication that the one or more assets have passed a revalidation process based on the expiration of the token responsive to the notification; and reissue the token for the one or more assets based on the revalidation process.

Example 21 is a computing apparatus comprising: a computer-readable storage medium; processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: receive a request to deploy one or more assets; determine a token associated with the one or more assets; validate the one or more assets based on the token; and deploy the one or more assets based on the token.

Example 22 is the computing apparatus of any previous or subsequent Example, wherein the processor-executable instructions to validate the one or more assets based on the token, when executed by the one or more processors, further direct the computing apparatus to: receive, from an attestation directory, a generated token, wherein the generated token is generated based on a unique identifier associated with the one or more assets; compare the token associated with the one or more assets with the generated token; and validate the one or more assets as compliant with one or more respective policies based on the comparison.

Example 23 is the computing apparatus of any previous or subsequent Example, wherein the processor-executable instructions, when executed by the one or more processors, further direct the computing apparatus to: receive, from an attestation engine, a notification that the token associated with the one or more assets exceeds an attestation threshold; perform a revalidation process on the one or more assets; transmit, to the attestation engine, an indication that the one or more assets pass the revalidation process; and receive, from the attestation engine, a notification that the token is reissued for the one or more assets based on the revalidation process.

Example 24 is the computing apparatus of any previous or subsequent Example, wherein the processor-executable instructions, when executed by the one or more processors, further direct the computing apparatus to: receive, from an attestation engine, a notification that the token associated with the one or more assets is revoked; perform a revalidation process on the one or more assets responsive to the revocation of the token; transmit, to the attestation engine, an indication that the one or more assets pass the revalidation process; and receive, from the attestation engine, a notification that the token is reissued for the one or more assets based on the revalidation process.

Example 25 is the computing apparatus of any previous or subsequent Example, wherein the processor-executable instructions, when executed by the one or more processors, further direct the computing apparatus to: receive, from an attestation engine, a notification that the token associated with the one or more assets is revoked; and decommission the one or more assets from operation.

What is claimed is:

1. A computing apparatus comprising:

a computer-readable storage medium;

an attestation engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least:

identify a request to deploy an executable asset;

receive an indication that the executable asset is compliant with one or more security policies;

generate a token certifying compliance of the executable asset with the one or more security policies, wherein generating the token comprises performing a cryptographic hash operation over an asset identifier and a baseline configuration state of the executable asset;

assign the token to the executable asset;

validate the executable asset as compliant with the one or more security policies based on the token;

monitor the executable asset during runtime to detect a technical configuration change affecting compliance with the one or more security policies; and in response to detecting the technical configuration change, initiate a security enforcement action comprising at least revoking the token.

2. The computing apparatus of claim 1, wherein the processor-executable instructions to validate the executable asset as compliant with the one or more security policies based on the token, when executed by the one or more processors, further direct the computing apparatus to:

determine one or more attestation thresholds associated with the token;

determine that the executable asset exceed a first attestation threshold of the one or more attestation thresholds; and generate a notification that the executable asset require revalidation.

3. The computing apparatus of claim 1, wherein the attestation engine comprises an attestation directory and the processor-executable instructions to assign the token to the executable asset, when executed by the one or more processors, further direct the computing apparatus to:

perform a hashing process on the token and the executable asset to generate a hash value for the executable asset; and associate the hash value with the token in the attestation directory.

4. The computing apparatus of claim 1, wherein the request to deploy the executable asset is received from a client device, and the processor-executable instructions, when executed by the one or more processors, further direct the computing apparatus to:

generate a notification that the token is issued for the executable asset, wherein the notification grants authority to deploy the executable asset based on compliance of the executable asset with the one or more security policies; and transmit the notification to the client device.

5. The computing apparatus of claim 1, wherein the processor-executable instructions, when executed by the one or more processors, further direct the computing apparatus to:

determine an expiration of the token;

generate a notification of the expiration of the token;

receive an indication that the executable asset have passed a revalidation process based on the expiration of the token responsive to the notification; and reissue the token for the executable asset based on the revalidation process.

6. The computing apparatus of claim 1, wherein the processor-executable instructions, when executed by the one or more processors, further direct the computing apparatus to:

receive a second request associated with the executable asset;

determine that the token is associated with the executable asset; and generate a notification that the second request is authorized to proceed based on the token.

7. The computing apparatus of claim 1, wherein the processor-executable instructions, when executed by the one or more processors, further direct the computing apparatus to:

revoke the token based on an expiration of the token; and generate a notification comprising an indication of the expiration of the token and a revalidation requirement for the executable asset.

8. A method comprising:

identifying, by an attestation engine, a request to deploy one or more an executable asset;

determining, by the attestation engine, that the one or more the executable asset is compliant with one or more security policies;

generating, by the attestation engine, a token certifying compliance, that the executable asset are compliant with the one or more security policies, wherein generating the token comprises performing a cryptographic hash operation over an asset identifier and a baseline configuration state of the executable asset;

assigning, by the attestation engine, the token to the one or more executable asset;

validating, by the attestation engine, the executable asset based on the token;

monitoring, by the attestation engine, the executable asset during runtime to detect a technical configuration change affecting compliance with the one or more security policies; and in response to detecting the technical configuration change, automatically initiating, by the attestation engine, a security enforcement action comprising at least revoking the token authenticating, by the attestation engine, the executable asset as compliant with the one or more security policies based on the token.

9. The method of claim 8, wherein assigning, by the attestation engine, the token to the executable asset comprises:

performing, by the attestation engine, a tokenization process based on the token and the executable asset, wherein the tokenization process generates a cryptographic value for the executable asset that links the executable asset to the token.

10. The method of claim 8, wherein the attestation engine comprises an attestation directory comprising a plurality of tokens and a plurality of asset identifiers, wherein the each of the plurality of asset identifiers is associated with a respective token of the plurality of tokens.

11. The method of claim 8, wherein determining that the executable asset are compliant with one or more security policies comprises:

receiving, by the attestation engine, an indication that the executable asset are compliant with the one or more security policies from a security system.

12. The method of claim 8, wherein the request to deploy the executable asset is received from a client device and the method further comprises:

generating, by the attestation engine, a notification of the token assignment to the executable asset based on compliance with the one or more security policies; and transmitting, by the attestation engine, the notification to the client device, wherein the notification comprises information on the one or more security policies and the executable asset.

13. The method of claim 8, wherein the request to deploy the executable asset is issued by a DevOps platform; and the DevOps platform comprises the attestation engine.

14. The method of claim 8, wherein authenticating, by the attestation engine, the executable asset as compliant with the one or more security policies based on the token comprises:

determining, by the attestation engine, an attestation threshold for the token based on the one or more security policies;

determining, by the attestation engine, that the executable asset exceed the minimum attestation threshold;

receiving, by the attestation engine, an indication that the executable asset pass a revalidation process; and reauthenticating, by the attestation engine, that the executable asset are compliant with the one or more security policies based on the token and the revalidation process.

15. A computer-readable storage medium comprising processor-executable instructions, wherein the processor-executable instructions comprise an attestation engine configured to cause one or more processors to:

identify a request to deploy an executable asset;

receive an indication that the executable asset is compliant with one or more security policies;

generate a token certifying compliance of the executable asset with the one or more security policies, wherein generating the token comprises performing a cryptographic hash operation over an asset identifier and a baseline configuration state of the executable asset;

assign the token to the executable asset;

validate the executable asset as compliant with the one or more security policies based on the token;

monitor the executable asset during runtime to detect a technical configuration change affecting compliance with the one or more security policies; and in response to detecting the technical configuration change, initiate a security enforcement action comprising at least revoking the token.

16. The computer-readable storage medium of claim 15, wherein the processor-executable instructions of the attestation engine to validate the executable asset as compliant with the one or more security policies based on the token cause the one or more processors to further execute processor-executable instructions stored in the computer-readable storage medium to:

determine one or more attestation thresholds associated with the token;

determine that the executable asset exceed a first attestation threshold of the one or more attestation thresholds;

revoke the token based on the first attestation threshold being exceeded; and generate a notification that the executable asset require revalidation.

17. The computer-readable storage medium of claim 15, wherein the request to deploy the executable asset is received from a client device, and the processor-executable instructions cause the one or more processors to further execute processor-executable instructions stored in the computer-readable storage medium to:

generate a notification indicating authentication of the executable asset as compliant with the one or more security policies based on the token; and transmit the notification to the client device.

18. The computer-readable storage medium of claim 15, wherein the processor-executable instructions of the attestation engine to assign the token to the executable asset cause the one or more processors to further execute processor-executable instructions stored in the computer-readable storage medium to:

generate a cryptographic value for the executable asset based on the token and the executable asset, wherein the cryptographic value links the executable asset to the token; and store the cryptographic value in an attestation directory, wherein the attestation engine comprises the attestation directory.

19. The computer-readable storage medium of claim 15, the processor-executable instructions cause the one or more processors to further execute processor-executable instructions stored in the computer-readable storage medium to:

determine an unauthorized event associated with the executable asset; and revoke the token based on the unauthorized event.

20. The computer-readable storage medium of claim 15, the processor-executable instructions cause the one or more processors to further execute processor-executable instructions stored in the computer-readable storage medium to:

determine an expiration of the token;

generate a notification of the expiration of the token;

receive an indication that the executable asset have passed a revalidation process based on the expiration of the token responsive to the notification; and reissue the token for the executable asset based on the revalidation process.

21. A computing apparatus comprising:

a computer-readable storage medium;

processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least:

receive a request to deploy an executable asset;

determine a token associated with the executable asset;

validate the executable asset based on the token;

deploy the executable asset based on the token;

in response to receiving a notification that the token has been revoked due to a technical configuration change detected during runtime of the executable asset, automatically prevent further execution of the executable asset.

22. The computing apparatus of claim 21, wherein the processor-executable instructions to validate the one or more assets based on the token, when executed by the one or more processors, further direct the computing apparatus to:

receive, from an attestation directory, a generated token, wherein the generated token is generated based on a unique identifier associated with the executable asset;

compare the token associated with the executable asset with the generated token; and validate the executable asset as compliant with one or more respective policies based on the comparison.

23. The computing apparatus of claim 21, wherein the processor-executable instructions, when executed by the one or more processors, further direct the computing apparatus to:

receive, from an attestation engine, a notification that the token associated with the executable asset exceeds an attestation threshold;

perform a revalidation process on the executable asset;

transmit, to the attestation engine, an indication that the executable asset pass the revalidation process; and receive, from the attestation engine, a notification that the token is reissued for the executable asset based on the revalidation process.

24. The computing apparatus of claim 21, wherein the processor-executable instructions, when executed by the one or more processors, further direct the computing apparatus to:

receive, from an attestation engine, a notification that the token associated with the executable asset is revoked;

perform a revalidation process on the executable asset responsive to the revocation of the token;

transmit, to the attestation engine, an indication that the executable asset pass the revalidation process; and receive, from the attestation engine, a notification that the token is reissued for the executable asset based on the revalidation process.

25. The computing apparatus of claim 21, wherein the processor-executable instructions, when executed by the one or more processors, further direct the computing apparatus to:

receive, from an attestation engine, a notification that the token associated with the executable asset is revoked; and decommission the executable asset from operation.

* * * * *